United States Patent
Ahuja

(10) Patent No.: US 10,235,469 B2
(45) Date of Patent: Mar. 19, 2019

(54) SEARCHING FOR POSTS BY RELATED ENTITIES ON ONLINE SOCIAL NETWORKS

(71) Applicant: Facebook, Inc., Menlo Park, CA (US)

(72) Inventor: Gaurav Ahuja, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 300 days.

(21) Appl. No.: 15/365,113

(22) Filed: Nov. 30, 2016

(65) Prior Publication Data
US 2018/0150559 A1    May 31, 2018

(51) Int. Cl.
G06F 17/30    (2006.01)

(52) U.S. Cl.
CPC .. G06F 17/30867 (2013.01); G06F 17/30675 (2013.01)

(58) Field of Classification Search
CPC .................. G06F 17/30867; G06F 17/30675
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,752,326 B2 | 7/2010 | Smit | |
| 7,783,630 B1 | 8/2010 | Chevalier | |
| 7,797,635 B1 | 9/2010 | Denise | |
| 7,836,044 B2 | 11/2010 | Kamvar | |
| 7,840,589 B1 | 11/2010 | Holt | |
| 8,024,328 B2 | 9/2011 | Dolin | |
| 8,027,990 B1 | 9/2011 | Mysen | |
| 8,055,673 B2 | 11/2011 | Churchill | |
| 8,060,639 B2 | 11/2011 | Smit | |
| 8,082,278 B2 | 12/2011 | Agrawal | |
| 8,112,529 B2 | 2/2012 | Van Den Oord | |
| 8,135,721 B2 | 3/2012 | Joshi | |
| 8,145,636 B1 | 3/2012 | Jeh | |
| 8,180,804 B1 | 5/2012 | Narayanan | |
| 8,185,558 B1 | 5/2012 | Narayanan | |
| 8,209,330 B1 | 6/2012 | Covell | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |

(Continued)

*Primary Examiner* — Jorge A Casanova
(74) *Attorney, Agent, or Firm* — Baker Botts L.L.P.

(57) ABSTRACT

In one embodiment, a method includes receiving a text query comprising one or more n-grams inputted by a first user, identifying one or more primary entities matching one or more n-grams of the received text query, and identifying, for each of the identified primary entities, one or more related entities based on one or more related-entity indexes associated with the primary entity. The method also includes accessing, for each identified related entity, one or more posts authored by the identified related entity, each accessed post matching all of the n-grams of the received text query, calculating a score for each of the accessed posts, and sending to the first user one or more search results corresponding to one or more of the accessed posts having scores higher than a threshold score, respectively.

20 Claims, 7 Drawing Sheets

(56) References Cited

U.S. PATENT DOCUMENTS

| | | |
|---|---|---|
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0074289 A1 | 3/2015 | Hyman |
| 2015/0161519 A1 | 6/2015 | Zhong |

(56) References Cited

U.S. PATENT DOCUMENTS

| | | |
|---|---|---|
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniavskii |
| 2016/0259790 A1* | 9/2016 | Mashiach ............ G06F 17/3053 |
| 2017/0147696 A1* | 5/2017 | Evnine .............. G06F 17/30867 |
| 2017/0308583 A1* | 10/2017 | Husain .............. G06F 17/30528 |
| 2018/0181662 A1* | 6/2018 | Mashiach ......... G06F 17/30905 |

* cited by examiner

FIG. 5

510 — eagles of death metal paris attack | Fred | Home

Top | Latest | People | Photos | Videos | Pages | Places | Groups | Apps | Events

POSTED BY
- Anyone
- You
- Your Friends
- Your Friends and Groups
- ...Choose a Source...

TAGGED LOCATION
- Menlo Park, CA
- Seattle, WA
- ...Choose a Location...

DATE POSTED
- Anytime
- 2016
- 2015
- 2014
- ...Choose a Date...

Public Posts

Eagles of Death Metal — 525
November 25, 2015 — Like Page

We sat down with VICE to discuss the tragic events of November 13 in Paris: http://bitty/1NPtiXT

Eagles of Death Metal Discuss Paris Terror Attacks | VICE | United States — 520

The band spoke to VICE about the tragic events that took place at the Bataclan concert hall on November 13.
VICE.COM 22K    2.5K Comments  17K Shares Like   Comment   Share Jesse Hughes   Member of Eagles of Death Metal — 537
November 25, 2015

While the band is now home safe, we are horrified and still trying to come to terms with what happened in France. Our thoughts and hearts...
See More — 535

Like   Comment   Share — 530

Anne Hidalgo   Mayor of Paris — 547
November 13, 2015

In the face of terror, there is a nation that knows how to defend themselves, knows how to mobilise his forces and once again will defeat terrorists. #parisattack, #eaglesofdeathmetal — 545

See original • Rate this translation

Like   Comment   Share — 540

Trending
- U.S. Soccer   Sed ut perspiciatis unde omnis iste natus error sit voluptatem accusantium doloremque
- Marco Arturo   Sed ut perspiciatis unde omnis iste natus error sit voluptatem accusantium doloremque
- Madagascar   Sed ut perspiciatis unde omnis iste natus error sit voluptatem accusantium doloremque
- UEFA Euro 2016   Sed error sit perspiciatis unde omnis iste natus error sit voluptatem accusantium dol
- Neymar   Sed ut perspiciatis unde omnis iste natus error sit voluptatem accusantium doloremque
- AirBNB   Sed ut perspiciatis unde omnis iste natus error sit voluptatem accusantium doloremque
- Zika Virus   Sed ut perspiciatis unde omnis iste natus error sit voluptatem accusantium doloremque

People You May Know   See All
- Julie   11 Mutual friends   Add friend   ✕
- Monica   2 Mutual friends   Add friend   ✕

Sponsored   Create Ad

Mazda MX-5

SEARCHING FOR POSTS BY RELATED ENTITIES ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a user may conduct a search against the online social network by inputting a text query into a user interface of the social-networking system (e.g., a query field). In response to the user's input, the social-networking system may identify one or more content objects matching the inputted text query and provide one or more search results corresponding to one or more of the identified content objects for display to the user. Information about the identity of a particular content object's author may be helpful for the querying user to judge whether the content object is interesting, trustworthy, or reliable. The querying user may be more interested in a content object authored by an entity related to or knowledgeable about the topic of the content object than one authored by another entity. In particular embodiments, the social-networking system may specifically identify and provide for display to the querying user search results corresponding to content from authoritative or reliable sources with respect to one or more topics of the user's text query. It may also prioritize search results based on the authors of their corresponding content objects. Particular embodiments may thereby enhance the social-networking system's post search functionality in terms of its ability to find and prioritize search results corresponding to posts that are likely to be considered important or interesting by the querying user.

In particular embodiments, the social-networking system may identify one or more primary entities matching one or more n-grams of a text query and identify one or more related entities to the identified primary entities based on one or more related-entity indexes. The primary entities and related entities may comprise one or more of a person, an organization, a place, a topic, or another suitable entity. An entity may be treated as related to a primary entity and included in a related-entity index associated with the primary entity because one or more relationships between the related entity and the primary entity make the related entity an authoritative or reliable source of information with respect to the primary entity. The social-networking system may then access content objects (e.g., posts) authored by the identified related entities that match the text query, score the accessed posts based at least in part on social signals associated with the posts and their authors, and provide for display to the querying user one or more search results corresponding to one or more highly-scored posts.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5 illustrates an example user interface displaying example search results.

DESCRIPTION OF EXAMPLE EMBODIMENTS

System Overview

Figure 1:
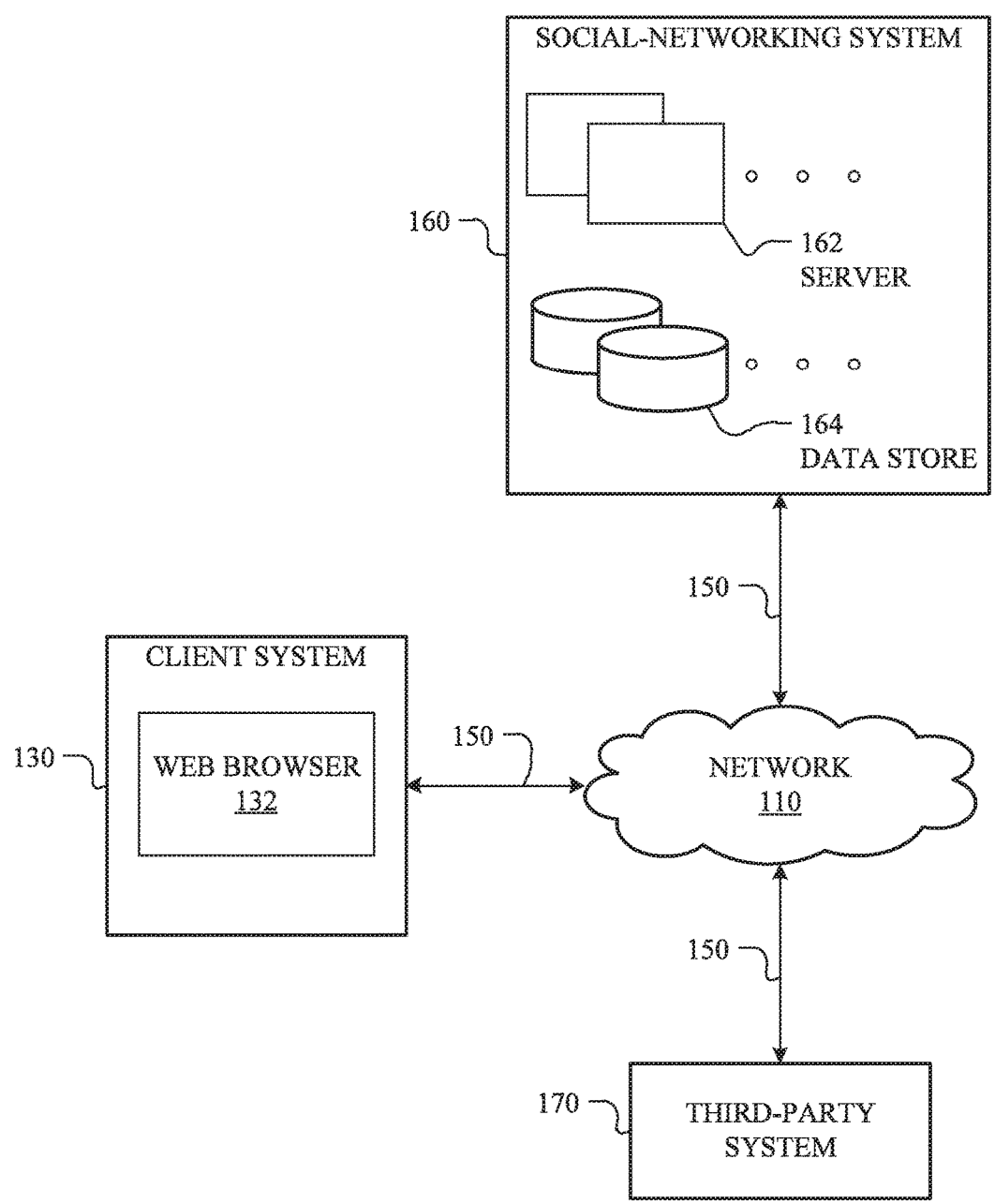
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
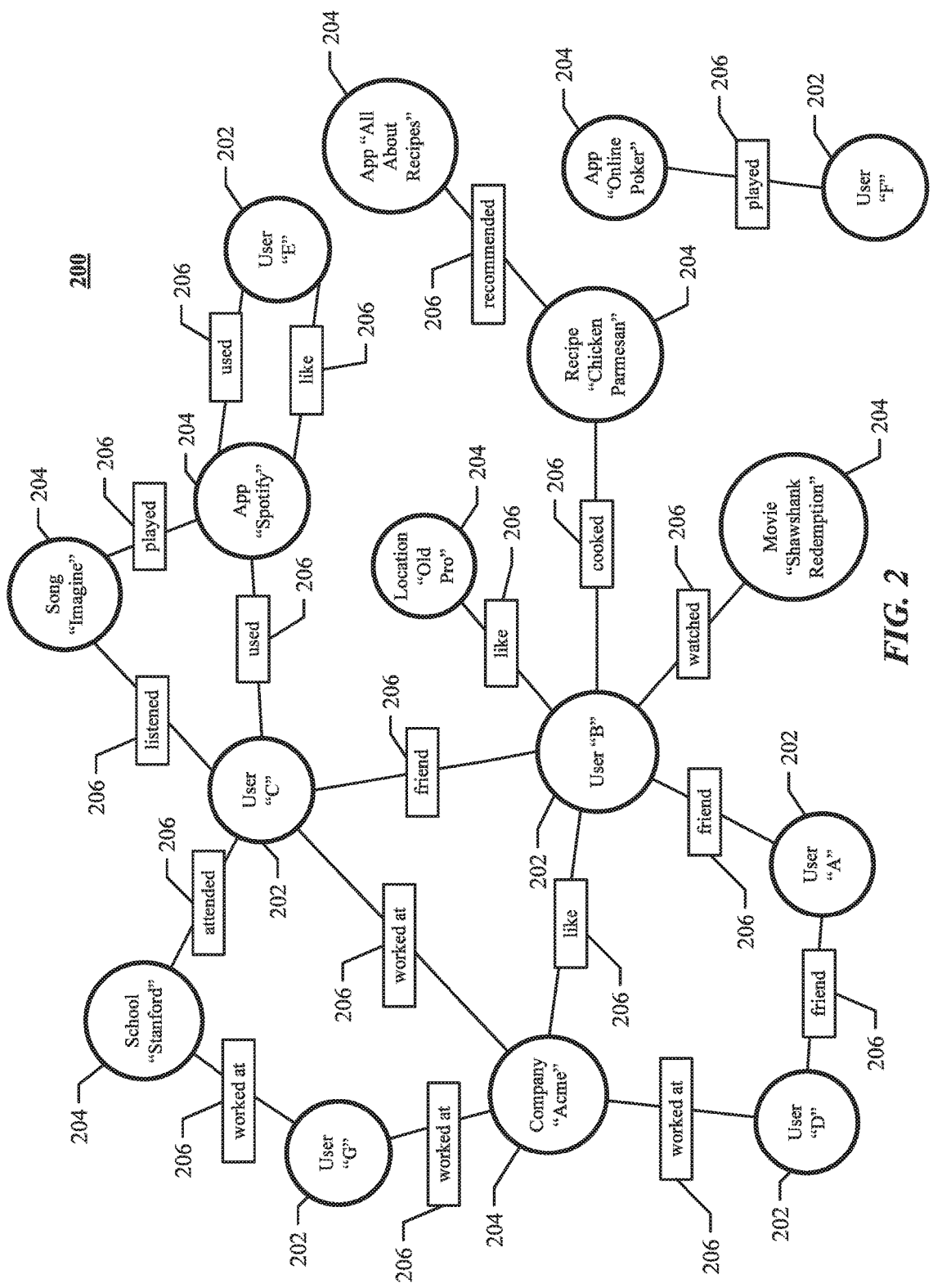
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
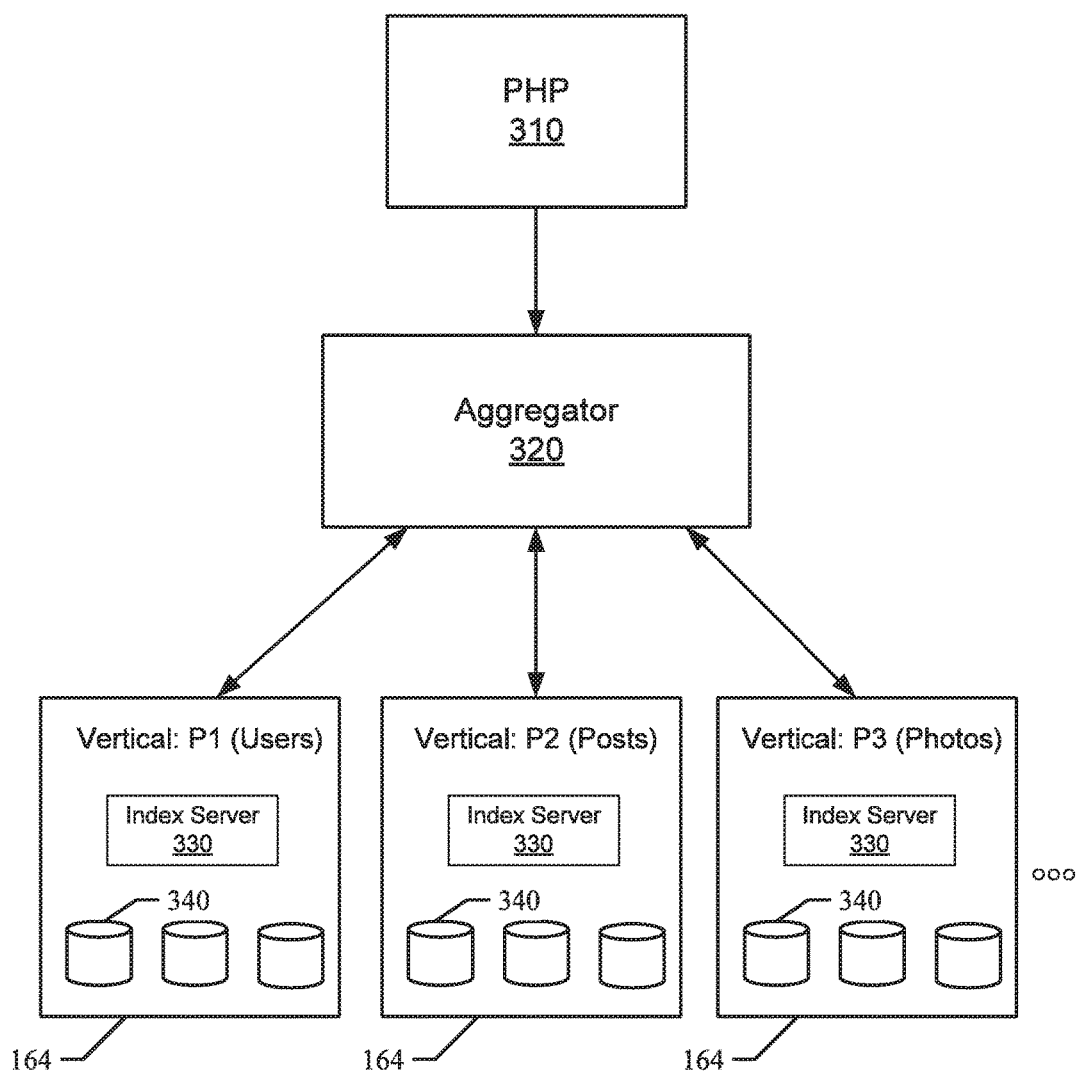
FIG. 3 illustrates an example partitioning for storing objects of a social-networking system.

FIG. 3 illustrates an example partitioning for storing objects of a social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned by based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs)

hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request (step 303). In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/870,113, filed 25 Apr. 2013, each of which is incorporated by reference.

Searching for Posts by Related Entities

In particular embodiments, the social-networking system 160 may identify one or more related entities to a text query inputted by a user and provide or prioritize one or more search results corresponding to posts authored by the identified related entities. The user may search against the online social network by inputting a text query into a user interface of the social-networking system 160 (e.g., a query field). The text query may comprise one or more n-grams. In response to the user's input, the social-networking system 160 may identify one or more content objects matching the inputted text query. The content objects may be associated with the online social network, a third-party system 170, or another suitable system. The content objects may comprise users, profile interfaces, posts, news stories, headlines, instant messages, group/chat room conversations, emails, advertisements, pictures, videos, audio files (e.g., music), other suitable objects, or any combination thereof. The social-networking system 160 may then provide one or more search results corresponding to one or more of the identified content objects for display to the user. It may be desirable for the social-networking system 160 to determine whether particular content objects are likely to be viewed as interesting or reliable by the user and select or prioritize the search results accordingly. Information about the content objects' authors may be particularly useful for consideration by the social-networking system 160 in making such determinations. In particular embodiments, the social-networking system 160 may identify one or more primary entities matching one or more n-grams of the text query and identify one or more related entities to the identified primary entities based on one or more related-entity indexes. The primary entities and related entities may comprise one or more of a person, an organization, a place, a topic, or another suitable entity. An entity may be treated as related to a primary entity and included in a related-entity index associated with the primary entity because one or more relationships between the related entity and the primary entity make the related entity an authoritative or reliable source of information with respect to the primary entity. The social-networking system 160 may then access content objects (e.g., posts) authored by the identified related entities that match the text query, score the accessed posts based at least in part on social signals associated with the posts and their authors, and provide for display to the querying user one or more search results corresponding to one or more highly-scored posts. By providing or prioritizing search results corresponding to content from authoritative or reliable sources, particular embodiments may enhance the post search functionality of the social-networking system 160 in terms of its ability to find and prioritize posts that are likely to be informative with respect to particular persons, organizations, topics, locations, or other entities associated with an inputted text query.

As an example and not by way of limitation, a user may input a text query "the avengers" in a query field associated with the social-networking system 160 to search against the online social network. The social-networking system 160, in response, may identify a primary entity The Avengers, which matches the text query. This entity may refer to a fictional team of superheroes appearing in comic books and films. It may then access a related-entity index to identify one or more related entities to The Avengers (e.g., Iron Man, Captain America, S.H.I.E.L.D.). The identified related entities may be characters or organizations in the fictional works about The Avengers. The related-entity index may have been created, for example, based on a Wikipedia page corresponding to The Avengers, by extracting entity names mentioned therein. The related entities may have authored posts and published the posts on one or more interfaces associated with the online social network (e.g., the related entities' profile pages). The social-networking system 160 may access the posts authored by the related entities to identify those matching the text query and score the identified posts based at least in part on social signals (e.g., likes, shares, comments) associated with each post and its author. The social-networking system 160 may provide the querying user search results corresponding to content objects associated with the online social network that match the inputted text query. In presenting the search results, the social-networking system 160 may preferentially present search results that correspond to posts created by the related entities to the primary entity The Avengers. For example, on a search results interface, the social-networking system 160 may display a post authored by Iron Man about The Avengers in a more noticeable position (e.g., top of the interface) than a post authored by a regular (i.e., unrelated) entity (e.g., a post by Batman, who is not one of The Avengers). Although this disclosure describes providing or prioritizing search results corresponding to posts authored by related entities to an inputted text query in a particular manner, this disclosure contemplates providing or prioritizing search results corresponding to posts authored by related entities to an inputted text query in any suitable manner.

In particular embodiments, the social-networking system 160 may receive a text query from a client system 130 of a user of the online social network. The text query may comprise one or more n-grams inputted by the user. The text query may be an unstructured text query. The text query may be entered, for example, into a query field. The query field may be presented to the user via a webpage displayed by a web browser 132 on the user's client system 130 or via an application associated with the online social network installed on the user's client system 130. The text query comprising n-grams inputted by the user may be transmitted from the user's client system 130 to the social-networking system 160 via the network 110. As an example and not by way of limitation, the user may input a text query "the avengers" into a query field associated with the social-networking system 160 that is displayed on the client system 130 of the user. The text query may comprise at least the n-grams "the," "avengers," and "the avengers." As another example and not by way of limitation, the user may input a text query "paris attack eagles of death metal" in the query field. This text query may comprise at least the n-grams "paris," "paris attack," "eagles of death metal," and several other n-grams. Although this disclosure describes receiving particular text queries in a particular manner, this disclosure contemplates receiving any suitable text queries in any suitable manner.

In particular embodiments, the social-networking system 160 may identify one or more primary entities matching one or more n-grams of the received text query. The primary entities may comprise one or more of a person, an organization, a place, a topic, or another suitable entity. The social-networking system 160 may identify a primary entity by comparing the names of one or more entities with one or more n-grams of the received text query. The social-networking system 160 may alternatively or additionally identify a primary entity by identifying a user node 202, a concept node 204, or an edge 206 on the social graph 200 that matches one or more n-grams of the text query and identifying an entity associated with the identified element of the social graph 200. More information on identifying entities associated with text queries based on social graph information may be found in U.S. patent application Ser. No. 13/556,072, filed 23 Jul. 2012, and U.S. patent application Ser. No. 15/192,780, filed 24 Jun. 2016, which are incorporated by reference. The social-networking system 160 may alternatively or additionally identify a primary entity by identifying a node that matches one or more n-grams of the text query and inferring a topic based on the identified node. More information on identifying topics from text may be found in U.S. patent application Ser. No. 13/167,701, filed 24 Jun. 2011, and U.S. patent application Ser. No. 14/556,854, filed 1 Dec. 2014, which are incorporated by reference. As an example and not by way of limitation, from a text query "the avengers," the social-networking system 160 may identify a primary entity The Avengers, which is an organization whose name matches the text query. As another example and not by way of limitation, from a text query "paris attack eagles of death metal," the social-networking system 160 may identify primary entities Paris (a place), Paris Attack (a topic referring to a series of terrorist attacks that occurred in Paris on 13 Nov. 2015), and Eagles of Death Metal (a music band whose concert was a scene of terrorist attack on 13 Nov. 2015).

In particular embodiments, the social-networking system 160 may further identify one or more primary entities based on information stored in association with one or more trending topics associated with the received text query. Based on the trending topics, the social-networking system 160 may identify additional related entities whose posts may be provided as search results responsive to the received text query. The social-networking system 160 may continuously detect the activities of a plurality of users of the online social network such as, for example, searching, posting, commenting, sharing, another suitable activity, or any combination thereof. The detecting may be subject to privacy settings of each of the users involved. By doing so, the social-networking system 160 may identify a plurality of topics that are trending on the online social network at the moment. The topics may comprise people, places, events, other topics, or any combination thereof, which may be provided by a topic tagger service associated with the online social network. The trending nature of a topic may be indicated by an uptick in social-networking activities related to the topic. The identified topics may be compiled into a list of trending topics. Whether a particular topic is trending (e.g., in terms of a level of popularity of the topic) may be characterized by a function of any combination of one or more factors corresponding to the activities detected. As an example and not by way of limitation, the function for characterizing the level of popularity p of a particular topic may be represented by the following expression: $p = f_{t_1 \to t_2}(m_1, m_2, m_3)$, where $m_1$, $m_2$, and $m_3$ correspond to the number of searches, posts, and comments related to the topic on the online social network, respectively. The variables $m_1$, $m_2$, and $m_3$ may be evaluated within a specified timeframe from a time $t_1$ to a time $t_2$. The function may return a positive number if and only if the level of popularity of the topic meets a specified threshold such that the topic is eligible of being included in the trending-topic list. The function may return zero or a negative number otherwise. As another example and not by way of limitation, the variables $m_1$, $m_2$, and $m_3$ in the function $p = f_{t_1 \to t_2}(m_1, m_2, m_3)$ discussed above may correspond to rates of change for different types of activities on the online social network rather than the count of the number of these activities. Such a function may be specifically suitable for detecting upticks or spikes in social-networking activities associated with a particular topic. The social-networking system 160 may update the trending-topic list frequently so that it accurately represents the "trend" on the online social network. More information on trending topics may be found in U.S. patent application Ser. No. 14/858,366, filed 18 Sep. 2015, which is incorporated by reference.

In particular embodiments, the social-networking system 160 may store text associated with each of one or more trending topics included in the list of trending topics. The text may comprise one or more of a keyword, a headline describing the topic, a link to a content object associated with the topic, information about a lead story on the topic, or other suitable text associated with the topic. The text may be stored in one or more data stores 164 associated with the social-networking system 160 as metadata associated with the corresponding trending topic. More information on storing information associated with trending topics may be found in U.S. patent application Ser. No. 14/616,155, filed 6 Feb. 2015, which is incorporated by reference. The social-networking system 160 may identify one or more trending topics matching one or more n-grams of the received text query. As an example and not by way of limitation, right after the terrorist attack occurred in Paris in November 2015, the phrase "Paris Attack" may be included in the list of trending topics and stored in one or more data stores 164 associated with the social-networking system 160. The social-networking system 160 may identify that this trending topic matches the n-gram "paris attack" in the received text query "paris attack eagles of death metal" and that the received text query is about the trending topic Paris Attack. After determining that the received text query is about one or more trending topics, the social-networking system 160 may identify, for each of the identified trending topics associated with the text query, one or more primary entities matching the stored text associated with the identified trending topic. It may then search for related entities to the primary entities identified based on both the received text query and the stored text associated with the trending topics. As an example and not by way of limitation, "Game of Thrones Jon Snow," which refers to a popular TV show and a character of its corresponding story, may be identified as a trending topic. The social-networking system 160 may store, in association with this trending topic, the keywords "jon snow," "game of thrones," "kit harington," etc., the headline "Game of Thrones shocker: Jon Snow lives!" (a surprising plot turn of the TV show), and links to one or more news stories on this topic. If the querying user inputs "jon snow" as a text query, the social-networking system 160 may determine that the trending topic "Game of Thrones Jon Snow" matches the n-gram "jon snow" of the inputted text query and that the text query is about the trending topic. In response to this text query, the social-networking system 160 may identify as primary entities not only entities matching one or more n-grams in the text query itself, but also entities matching one or more n-grams included in, for example, the keywords, the headline, and the news stories stored in association with the identified trending topic "Game of Thrones Jon Snow." The identified primary entities may comprise, for example, Jon Snow, Game of Thrones, and Kit Harington (the actor who plays Jon Snow), which may or may not match the n-grams of the inputted text query. Although this disclosure describes identifying particular primary entities associated with a received text query in a particular manner, this disclosure contemplates identifying any suitable primary entities associated with a text query in any suitable manner.

In particular embodiments, the social-networking system 160 may identify, for each of the identified primary entities, one or more related entities based at least in part on one or more related-entity indexes associated with the primary entity. Each related-entity index may map from identification information of the primary entity to identification information of related entities to the primary entity. The social-networking system 160 may pre-generate one or more related-entity indexes for each of a plurality of entities associated with the online social network and store such related-entity indexes in one or more data stores 164 of the social-networking system 160. The stored related-entity indexes may be updated periodically or dynamically. Alternatively, the social-networking system 160 may generate one or more related-entity indexes in real time upon receiving a text query from the querying user. A related-entity index may comprise a plurality of entries, each mapping from identification information of the primary entity corresponding to the index to identification information of one or more other entities that are related to the primary entity or considered to be authoritative or reliable information sources about the primary entity. The identification information may comprise a name, an identification number, a hash key, other suitable identification information, or any combination thereof. The related-entity indexes may be searchable by the social-networking system 160 to identify one or more related entities for a particular primary entity. As an example and not by way of limitation, the social-networking system 160 may store a related-entity index associated with the entity Eagles of Death Metal, a music band. The related-entity index may comprise a plurality of entries. Each entry may comprise identification information of Eagles of Death Metal and identification information of an entity related to the band. The related entities whose identification information is included in the related-entity index may comprise, for example, members of the band, famous songs or albums of the band, music commentators who have published on the band or the band's genre, other suitable entities, or any combination thereof. The related-entity indexes may be generated and stored using one or more of a plurality of data structures. Such data structures may comprise, for example, an array, a set, a tree, another suitable data structure, or any combination thereof.

In particular embodiments, the social-networking system 160 may generate one or more of the related-entity indexes based at least in part on one or more online encyclopedic indexes (e.g., freebase.com, wikipedia.org). As an example and not by way of limitation, the social-networking system 160 may access a Wikipedia page about the entity Eagles of Death Metal and search through the text and links included in the page to identify information about other entities associated with the online social network. For example, the social-networking system 160 may determine that Josh Homme is related to Eagles of Death Metal based on the fact that the accessed Wikipedia page contains a link to another Wikipedia page that corresponds to Josh Homme. The social-networking system 160 may also determine that Jesse Hughes is related to Eagles of Death Metal based on the fact that the former's name appears multiple times on the Wikipedia page associated with the later. The social-networking system 160 may further infer that the relationship between Jesse Hughes and Eagles of Death Metal is that the former is a member of the latter based on the fact that the former's name appears in a "Members" field on the Wikipedia page. Based on the Wikipedia page, the social-networking system 160 may determine that the entities Josh Homme and Jesse Hughes are likely to be authoritative or reliable sources of information with respect to Eagles of Death Metal and thereby include their identification information in a related-entity index associated with Eagles of Death Metal.

In particular embodiments, the social-networking system 160 may additionally generate one or more of the related-entity indexes based at least in part on social-graph information associated with the one or more primary entities. For a particular primary entity, the social-networking system 160 may identify one or more related entities that are connected to the primary entity on the social graph 200 or have an affinity coefficient with the primary entity within a particular range. As an example and not by way of limitation, the social-networking system 160 may access the social graph 200 and identify one or more nodes connected to the node representing Jon Snow by one or more edges 206. The social-networking system 160 may then access or calculate an affinity coefficient between Jon Snow and each of the entities corresponding to the identified nodes. It may identify those entities whose affinity coefficients with Jon Snow are above a threshold value to be related entities to Jon Snow. For example, the social-networking system 160 may determine that a node representing Eddard Stark, another character in Games of Thrones, is connected to the node representing Jon Snow on the social graph 200 and that their affinity coefficient is greater than a threshold. The social-networking system 160 may accordingly include Eddard Stark in a related-entity index associated with Jon Snow.

In particular embodiments, the social-networking system 160 may generate one or more of the related-entity indexes based at least in part on a co-occurrence of references to the one or more primary entities with references to the one or more related entities within content associated with the online social network. For a particular primary entity, the social-networking system 160 may extract names of one or more related entities from one or more content objects associated with the primary entity on the online social network. The content objects may comprise profile interfaces, posts, news stories, headlines, instant messages, chat room conversations, emails, advertisements, pictures, videos, audio files (e.g., music), other suitable objects, or any combination thereof. The content objects may comprise a reference (e.g., name, hash tag) to the primary entity, be authored by the primary entity, or be included in an interface associated with the primary entity (e.g., the primary entity's profile interface). As an example and not by way of limitation, the social-networking system 160 may access a plurality of content objects comprising references to the entity France on the online social network. It may determine that the name François Hollande, a reference to the president of France, appears frequently in the accessed content objects. It may then extract this name and include it in a related-entity index associated with the entity France. For a particular entity, the social-networking system 160 may generate different and separate related-entity indexes, each associated with the entity, with different ones of the aforementioned methods. Alternatively, the social-networking system 160 may compile identification information of related entities identified based on various methods or sources into one related-entity index associated with the entity. More information on identifying authors or related entities for topics may be found in U.S. patent application Ser. No. 14/554,190, filed 26 Nov. 2014, which is incorporated by reference.

In particular embodiments, the social-networking system 160 may generate a related-entity index for at least one of the identified primary entities based on one or more entities determined to be similar to the primary entity. Specifically, the social-networking system 160 may identify one or more similar entities to the primary entity and populate the related-entity index for the primary entity with one or more related entities extracted from one or more related-entity indexes associated with the identified similar entities. It may be the case that an entity knowledgeable about a particular topic is likely to be knowledgeable about a similar topic. This may motivate "borrowing" related entities from a similar entity's related-entity indexes. As an example and not by way of limitation, for the primary entity Iron Man, the social-networking system 160 may identify one or more similar entities including, for example, Captain America. The social-networking system 160 may determine that the two entities are similar based on the fact that both are superhero figures from a same fictional story. The social-networking system 160 may thereby extract one or more related entities from one or more related-entity indexes associated with Captain America and include them in a related-entity index associated with Iron Man. For example, the extracted related entities may comprise Joss Whedon, a director of The Avengers films, which include both Iron Man and Captain America as characters.

In particular embodiments, each related-entity index may further comprise relevance scores for the related entities with respect to the primary entity associated with the related-entity index. The relevance score for a particular related entity may indicate how important, related, relevant, authoritative, or knowledgeable the related entity is to the primary entity. The related entities may be ranked in the related-entity index based on their respective relevance scores. For each related-entity index associated with a primary entity, the social-networking system 160 may calculate the relevance score for each related entity with respect to the primary entity based at least in part on one or more of a similarity coefficient between the related entity and the primary entity, an affinity coefficient between the related entity and the primary entity, a frequency of co-occurrence of references to the related entity and the primary entity within content associated with the online social network, a related-entity index associated with the related entity listing the primary entity, an interface of an encyclopedic index or the online social network associated with the related entity mentioning the primary entity, or another suitable factor. As an example and not by way of limitation, the entities Howard Stark and Steve Rogers may both be included in a related-entity index associated with Tony Stark (all three entities correspond to fictional characters related to The Avengers). The social-networking system 160 may assign a higher similarity coefficient to Howard Stark than Steve Rogers with respect to Tony Stark based at least in part on the fact that Howard Stark and Tony Stark share a last name. It may then calculate a greater relevance score for Howard Stark than for Steve Rogers based on the similarity coefficient factor. As another example and not by way of limitation, the entities François Hollande (President of France) and Anne Hidalgo (Mayor of Paris) may both be included in a related-entity index associated with the entity Paris. Paris, on the other hand, may be included in Anne Hidalgo's related-entity indexes but not in François Hollande's. Based on this fact, the social-networking system 160 may infer that Anne Hidalgo has a closer relationship with Paris than François Hollande. It may accordingly calculate a greater relevance score for Anne Hidalgo than for François Hollande with respect to Paris. The relevance score for a related entity may be a function of any combination of the factors described above. As an example and not by way of limitation, the function for calculating a relevance score r may be represented by the following expression: $r=f(r_1, r_2, r_3)$, where $r_1$, $r_2$, and $r_3$ respectively correspond to a similarity score between, an affinity coefficient between, and a frequency of co-occurrence of references to the primary entity and the related entity. One or more of the factors described above may have a binary effect on the relevance score r. As an example and not by way of limitation, the above equation may be modified such that: $r=0.5 \cdot f(r_1, r_2, r_3)+0.5 \cdot r_4$, where $r_4$ is evaluated at 1 if a related-entity index associated with the related entity lists the primary entity and 0 otherwise. The value of $f(r_1, r_2, r_3)$ may be normalized to fall within the range from 0 to 1. $r_4$, therefore, may control the range of the value of r as either from 0 to 0.5 or from 0.5 to 1.

In particular embodiments, the social-networking system 160 may identify all entities (other than the primary entity) whose identification information is included in the related-entity indexes associated with a primary entity as related entities to the primary entity. Alternatively, the social-networking system 160 may select one or more related entities whose identification information is included in the related-entity indexes associated with the primary entity based on the relevance scores calculated for the related entities. Although this disclosure describes identifying particular related entities to a primary entity in a particular manner, this disclosure contemplates identifying any suitable related entities to a primary entity in any suitable manner.

Figure 4A:
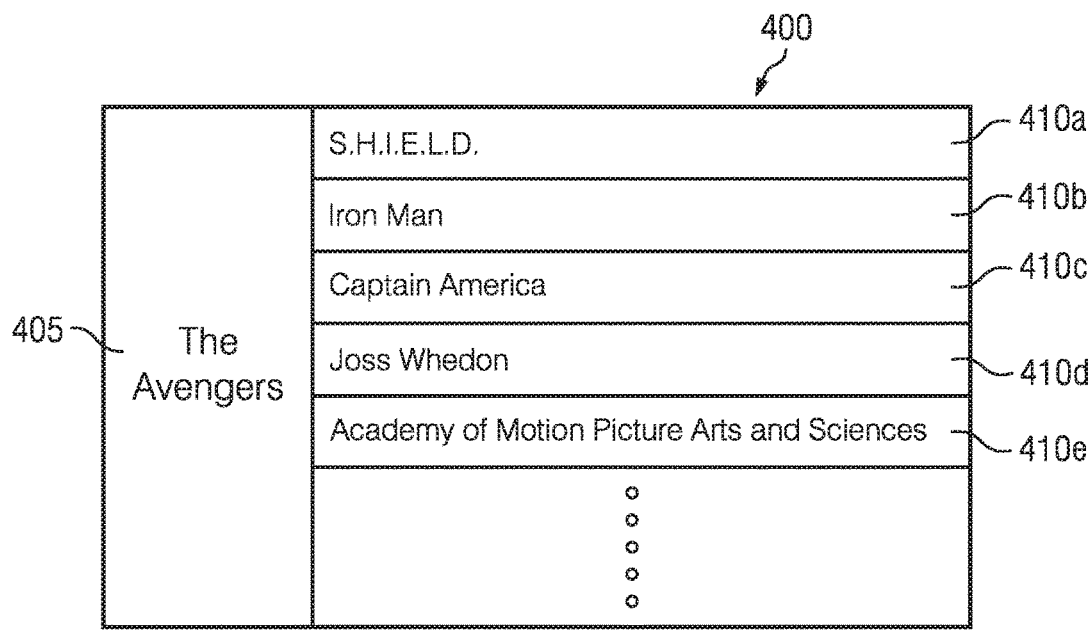
FIGS. 4A-4B illustrate example related-entity indexes.
Figure 4B:
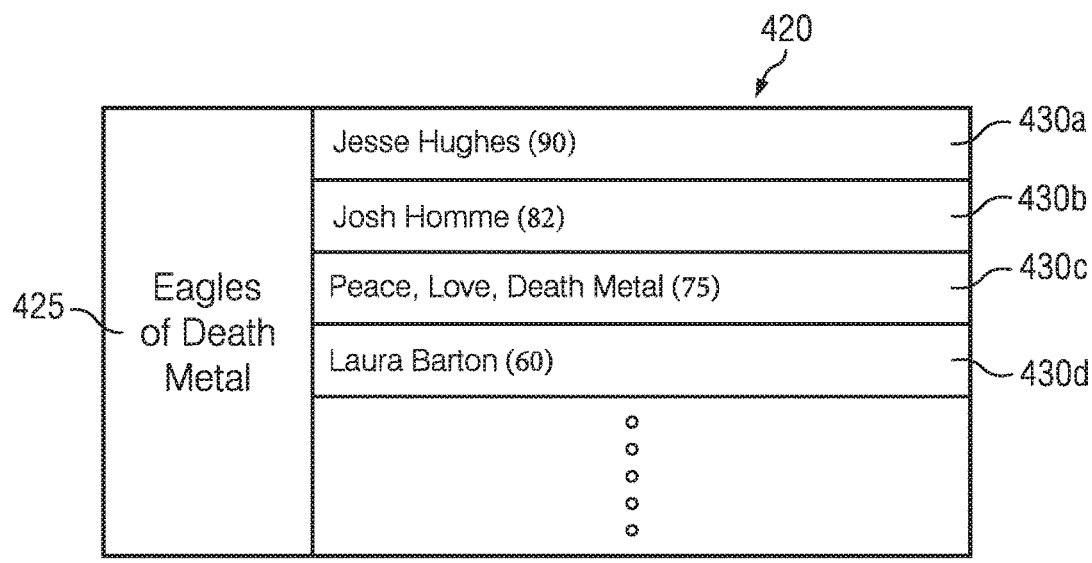

FIGS. 4A-4B illustrate example related-entity indexes. In particular embodiments, the social-networking system 160 may generate one or more related entity indexes for each of a plurality of entities associated with the online social network and store such related-entity indexes in one or more data stores 164 of the social-networking system 160. Specifically, the social-networking system 160 may generate a related-entity index 400 for the entity The Avengers. The entity may correspond to a concept node 204 on the social graph 200 associated with the online social network. The related-entity index 400 may comprise identification information for the entity The Avengers 405. It may map the identification information 405 to identification information of related entities to The Avengers 410. The related entities included in the related-entity index 400 may be identified based on one or more online encyclopedic indexes, social-graph information, one or more content objects associated with the online social network, another suitable source, or any combination thereof. As an example and not by way of limitation, the related-entity index 400 may comprise identification information for S.H.I.E.L.D. (an organization associated with The Avengers) 410a, Iron Man (a member of the Avengers) 410b, Captain America (a member of The Avengers) 410c, Joss Whedon (a director of films about The Avengers) 410d, and the Academy of Motion Picture Arts and Sciences (a professional honorary organization in the field of filmmaking) 410e. The related-entity index 400 may further include identification information for a plurality of other related entities to The Avengers.

The social-networking system 160 may also generate a related-entity index 420 for the entity Eagles of Death Metal, a music band. The related-entity index 420 may comprise identification information for the entity Eagles of Death Metal 425. It may map the identification information 425 to identification information of related entities to the band 430. The related entities included in the related-entity index 420 may be identified based on one or more online encyclopedic indexes, social-graph information, one or more content objects associated with the online social network, another suitable source, or any combination thereof. As an example and not by way of limitation, the related-entity index 420 may comprise identification information for Jesse Hughes (a member of the band) 430a, Josh Homme (a member of the band) 430b, Peace, Love, Death Metal (an album of the band) 430c, and Laura Barton (a feature writer who has published about the band) 430d. The related-entity index 420 may further include identification information for a plurality of other related entities to Eagles of Death Metal. The related-entity index 420 may also comprise relevance scores for the related entities with respect to Eagles of Death Metal. The relevance score for a particular related entity may indicate how important, related, relevant, authoritative, or knowledgeable the related entity is to the primary entity. As an example and not by way of limitation, Jesse Hughes, who has a relevance score of 0.9 may be considered more knowledgeable about Eagles of Death Metal than Laura Barton, who has a relevance score of 0.6. Although FIGS. 4A-4B illustrate particular related-entity indexes, this disclosure contemplates any suitable related-entity indexes.

In particular embodiments, the social-networking system 160 may access, for each identified related entity, one or more posts authored by the identified related entity. Each accessed post may match all of the n-grams of the received text query. The social-networking system 160 may search one or more data stores 164 storing posts authored by the identified related entities for those that match all of the n-grams of the received text query. Alternatively or additionally, the social-networking system 160 may search the data stores 164 for posts authored by the identified related entities that match only one or more of the n-grams of the received text query (i.e., partial matches). The social-networking system 160 may search through all posts of all of the identified related entities indiscriminately or a portion of the posts selected based on the relevance scores associated with the related entities (e.g., more posts for related entities with higher relevance scores) or a time factor (e.g., only recent posts). One or more of the accessed posts may be published on one or more profile interfaces corresponding to one or more of the identified related entities, respectively. One or more of the accessed posts may alternatively be stored or published on one or more third-party systems 170. Such posts may be referenced on the online social network through one or more URL links.

In particular embodiments, the social-networking system 160 may calculate a score for each of the accessed posts based at least in part on a number of social signals associated with the post and the related entity authoring the post. The social-networking system 160 may then rank the accessed posts based on their corresponding scores. The social signals associated with a post may comprise one or more of a number of likes associated with the post, a number of comments on the post, a number of shares of the post, a change in a growth rate of an amount of social activities associated with the post, or another suitable social signal. The social-networking system 160 may preferentially score a post that has received extensive attentions or interactions from users of the online social network, as such a post may likely be of interest to the querying user. As an example and not by way of limitation, the social-networking system 160 may access a first post that has been liked 1000 times, commented on 500 times, and shared 300 times and a second post that has been liked 500 times, commented on 300 times, and shared 200 time. Both posts may match all n-grams of the received text query and be authored by a same related entity. The social-networking system 160 may calculate a greater score for the first post than for the second post based on the social signals associated with the posts. The social-networking system 160 may also preferentially score a post the amount of social activities associated with which has seen an uptick or a spike. Continuing the preceding example, the first post may have been published on the online social network for twenty days and the likes, comments, and shares for this first post may have been increasing at a roughly steady rate. The amount of social interactions for the second post, however, may have recently gone through a sudden increase due to a piece of breaking news related to the second post. The number of likes for the second post, for example, may have increased from 10 to 500 within the past day. Based on this significant change in the growth rate of the amount of social activities associated with the second post, the social-networking system 160 may calculate a higher score for the second post than the first post although the latter has a greater amount of social activities.

The social signals associated with the related entity authoring a post may comprise one or more of a number of followers for the related entity, a number of visits to a profile interface corresponding to the related entity, a number of likes on the related entity, or another suitable social signal. It may be the case that the querying user is likely to be interested in a post authored by an entity that is popular or famous on the online social network. As an example and not by way of limitation, the social-networking system 160 may access a post that is authored by a first related entity and a post that is authored by a second related entity. The first related entity may be a celebrity who has a large number of followers on the online social network. Many users visit a profile interface associated with the first related entity and interact with the content objects posted therein every day. The second related entity, on the other hand, may be an ordinary user of the online social network. The social-networking system 160 may calculate a greater score for the first post than for the second post based at least in part on the social signals associated with their respective authors.

In particular embodiments, the social-networking system 160 may calculate the score for an accessed post further based on one or more other factors. These other factors, in particular, may comprise a level of matching between the post and the received text query, a level of matching between the post and a headline stored in association with a trending topic associated with the text query, a level of authoritativeness of the related entity authoring the post with respect to the primary entity, another suitable factor, or any combination thereof. For a particular accessed post, the social-networking system 160 may determine the level of matching between the post and the received text query by searching one or more n-grams of the text query against the content of the post. It may determine a number of times that each n-gram of the received text query appears in the post. A higher number of occurrences of one or more component n-grams of the received text query in the accessed post may correspond to a higher level of matching of the post with the query. The social-networking system 160 may calculate a higher score for a post that matches the received text query closely.

For a particular post authored by a related entity that is identified based on text stored in association with a trending topic associated with the received text query, the social-networking system 160 may score the post further based on a level of matching between the post and a headline stored in association with the trending topic. The level of matching between the post and the headline may correspond to a number of occurrences of one or more component n-grams of the headline in the content of the post. The social-networking system 160 may preferentially score a post that matches the headline closely.

The social-networking system 160 may calculate the score for at least one of the accessed posts further based on a relevance score for the related entity authoring the post with respect to the primary entity. The relevance score for a particular related entity may indicate how important, related, relevant, authoritative, or knowledgeable the related entity is to the primary entity. It may be pre-generated and stored in one or more related-entity indexes associated with the primary entity. The social-networking system 160 may preferentially score a post authored by a related entity who has a high relevance score with respect to the primary entity and who is therefore likely to be authoritative or knowledgeable about the primary entity or the topic of the received text query.

In particular embodiments, the social-networking system 160 may calculate the score for each of the accessed posts further based on a time decay factor associated with the post. The time decay factor for each post may be based on a duration of time between a time associated with the post and a time of an event corresponding to a trending topic associated with the received text query. As an example and not by way of limitation, a time decay factor t may be calculated based on a function: $t = a \cdot b e^{-|t_2 - t_1|}$, where a and b are coefficients and $t_1$ and $t_2$ correspond to a time of an event and a time associated with a post, respectively. The social-networking system 160 may identify one or more trending topics matching one or more n-grams of the received text query. As described above, the trending topics may be included in a list of trending topics. The social-networking system 160 may have stored text associated with the listed trending topics. Furthermore, one or more of the trending topics included in the trending-topic list may each emerge from one or more real-world events. The social-networking system 160 may determine the times and geographical locations associated with these real-world events and store such information in one or more data stores 164 of the social-networking system 160 in association with one or more of the trending topics. A primary entity may be determined to be related to a trending topic if the primary entity was or otherwise could be identified based on text stored in association with the trending topic. The social-networking system 160 may calculate the score for a post authored by a related entity to the primary entity based on a time decay factor, which is based on a time associated with the post with respect to a time associated with the underlying event of a trending topic associated with the primary entity. A post that was published within a short time period after the occurrence of an underlying event for a trending topic may be preferentially scored by the social-networking system 160 as the post is likely to be about the event. Similarly, a quick growth in the amount of social activities associated with a post within a short time period after the occurrence of an underlying event for a trending topic may also indicate that the post is closely related to the event and cause the post to be preferentially scored by the social-networking system 160. As an example and not by way of limitation, the social-networking system 160 may identify a primary entity based on text stored in association with the trending topic Paris Attack, which emerged from the 13 Nov. 2015 terrorist attacks in Paris. The social-networking system 160 may then identify one or more related entities to the primary entity and at least a first post and a second post authored by one or more of the related entities. The first post may be created and published on the online social network on 14 Nov. 2015, which is one day after the underlying event of the trending topic. On the other hand, the second post may be created and published on the online social network on 10 Jan. 2015, which is about ten months before the underlying event. The social-networking system 160 may preferentially score the first post as against the second post based on the time decay factor.

In particular embodiments, the social-networking system 160 may calculate the score for each of the accessed posts further based on a geographic distance between a location associated with the related entity authoring the post and a location of an event associated with an identified trending topic associated with the received text query. It may be the case that an author who is located near the geographic location of a real-world event is more likely to be authoritative or knowledgeable about the event than an author who is located far from the geographic location. For a post authored by a related entity that is identified based on text stored in association with a trending topic, the social-networking system 160 score the post further based on the relationship between the related entity and the event underlying the trending topic. Continuing the preceding example, the social-networking system 160 may identify a first related entity authoring the first post and a second related entity authoring the second post based on text stored in association with the trending topic Paris Attack. The social-networking system 160 may access profile information associated with the first and second related entities with proper privacy authorizations from the entities. It may determine that the first related entity is located in Paris when creating the first post while the second related entity is located in London when creating the second post. The social-networking system 160 may thereby preferentially score the first post as against the second post because the geographic distance between the first related entity and the location of the underlying event of the trending topic Paris Attack is smaller than that for the second related entity.

The calculated score may be a function of any combination of the factors described above. As an example and not by way of limitation, the function for calculating a confidence score c may be represented by the following expression: $c=f(m_1, m_2, m_3)$, where $m_1$, $m_2$, and $m_3$ are three different factors. The calculated confidence score c may alternatively be a sum of different functions that may be weighted in a suitable manner (e.g., the weights being pre-determined by the social-networking system 160). As an example and not by way of limitation, the function for calculating a confidence score c may be represented by the following expression: $c=A\,f_1(m_1, m_2)+B\,f_2(m_3)$, where $m_1$, $m_2$, and $m_3$ are three different factors, and where A and B are two different weights. Although this disclosure describes calculating particular scores for particular posts in a particular manner, this disclosure contemplates calculating any suitable scores for any suitable posts in any suitable manner.

In particular embodiments, the social-networking system 160 may send, to the client system 130 of the querying user for display in response to the querying user inputting the one or more n-grams of the text query, one or more search results corresponding to one or more of the accessed posts having scores higher than a threshold score, respectively. The social-networking system 160 may store a pre-determined threshold score. It may alternatively generate the threshold score in real time based on the scores calculated for the accessed posts. The threshold score may have an absolute value or a dynamic value. The dynamic value may be defined such that search results corresponding to a certain number of top-ranked posts (e.g., top 7) are sent to the client system 130. The social-networking system 160 may compare the score calculated for each of the accessed posts with the threshold score and identify those posts that have scores greater than the threshold score. The social-networking system 160 may then generate a search result for each post having an above-threshold score. The search result may comprise, for example, a title of the post, an excerpt from the content of the post, an image associated with the post, information about an author of the post, one or more interactive elements allowing a user of the online social network to interact with the post (e.g., like, comment, share), another suitable component, or any combination thereof. The search results may be displayed on a webpage associated with the online social network accessed by a web browser 132 on the client system 130 of the querying user. The search results may alternatively be displayed in a user interface associated with an application corresponding to the social-networking system 160 that is installed on the client system 130 of the querying user. The client system 130 may display to the querying user a search results interface that only comprise one or more search results corresponding to one or more posts authored by one or more of the identified related entities. The displayed search results may be organized based at least in part on the scores of their corresponding posts. Specifically, a search result corresponding to a post having a higher score may be displayed at a more noticeable position within the interface displaying the search results (e.g., at the top of the interface). Alternatively, the search results corresponding to posts authored by the identified related entities may be aggregated with one or more other search results, which may correspond to other content objects associated with the online social network. The aggregated search results may be collectively displayed to the querying user in a search results interface on the client system 130. In this case, the search results corresponding to posts authored by identified related entities may be given priority as against the other search results when displayed to the querying user.

In particular embodiments, each of one or more search results sent by the social-networking system 160 may comprise a snippet associated with the related entity authoring the post corresponding to the search result. The snippet may comprise information describing a relationship between the related entity and the primary entity associated with the related entity. The social-networking system 160 may determine the relationship between the related entity and the primary entity based on social graph information associated with the entities. Specifically, the relationship between the entities may be described by an edge 206 connecting the nodes corresponding to the entities. The social-networking system 160 may alternatively or additionally determine the relationship between the entities based on profile information associated with the entities. By providing a contextual snippet in association with a search result, the social-networking system 160 may aid the querying user in judging the importance, relevance, or reliability of the post associated with the search result. More information on snippets may be found in U.S. patent application Ser. No. 13/827,214, filed 14 Mar. 2013, U.S. patent application Ser. No. 14/797,819, filed 13 Jul. 2015, and U.S. patent application Ser. No. 14/938,685, filed 11 Nov. 2015, which are incorporated by reference.

In particular embodiments, the social-networking system 160 may further send to the client system 130 for display one or more search results corresponding to one or more posts authored by one or more of the identified primary entities in addition to those authored by the related entities. The social-networking system 160 may access, for each identified primary entity, one or more posts authored by the primary entity. Each of the accessed posts may match all of the n-grams of the received text query. The social-networking system 160 may calculate a score for each of the accessed posts based at least in part on a number of social signals associated with the post and the primary entity authoring the post. It may then send, to the client system 130 of the querying user for display in response to the user inputting the one or more n-grams of the text query, one or more search results corresponding to one or more of the accessed posts having scores higher than a threshold score, respectively. Search results corresponding to posts authored by primary entities may be combined with search results corresponding to posts authored by related entities. They may be organized within a search results interface associated with the online social network collectively based on their scores. Particular embodiments may prioritize posts authored by primary entities over posts authored by related entities when presenting their corresponding search results to the querying user. Each of the search results corresponding to posts authored by primary entities may further comprise a contextual snippet indicating the identity of the primary entity. Although this disclosure describes sending particular search results for display in a particular manner, this disclosure contemplates sending any suitable search results for display in any suitable manner.

FIG. 5 illustrates an example user interface displaying example search results. In particular embodiments, responsive to a search attempt by a querying user, the client system 130 of the user may display a user interface comprising one or more search results 520-540. The information displayed may have been received from the social-networking system 160. The user interface may comprise a query field 510. In this example, the querying user may have inputted a text query "eagles of death metal paris attack" in the query field 510 to search the online social network. The social-networking system 160 may identify one or more primary entities matching one or more n-grams of the received text query. The primary entities, for example, may comprise Eagles of Death Metal, Paris, and other suitable entities. The social-networking system 160 may identify one or more related entities to each of the identified primary entities and access posts authored by the related entities. For example and without limitation, Jesse Hughes (a member of Eagles of Death Metal) and Anne Hidalgo (Mayor of Paris) may be identified as such related entities. The social-networking system 160 may then send one or more search results corresponding to posts authored by one or more of the primary entities or the related entities to the client system 130 of the querying user for display. The search result 520 may correspond to a post by Eagles of Death Metal, which may be one of the identified primary entities. The search result 520 may comprise identification information of the author of the post 525. The search result 530 may correspond to a post by Jesse Hughes, who may be one of the identified related entities. The search result 530 may comprise identification information for the author of the post 535 and a contextual snippet 537 indicating a relationship between the related entity Jesse Hughes and his corresponding primary entity Eagles of Death Metal. The search result 540 may correspond to a post by Anne Hidalgo, who may be one of the identified related entities. The search result 540 may comprise identification information for the author of the post 545 and a contextual snippet 547 indicating a relationship between the related entity Anne Hidalgo and her corresponding primary entity Paris. The search results 520-540 may be organized in this search results interface based at least in part on their corresponding scores calculated by the social-networking system 160. Although FIG. 5 illustrates displaying particular search results in a particular user interface in a particular manner, this disclosure contemplates displaying any suitable search results in any suitable user interface in any suitable manner.

Figure 6:
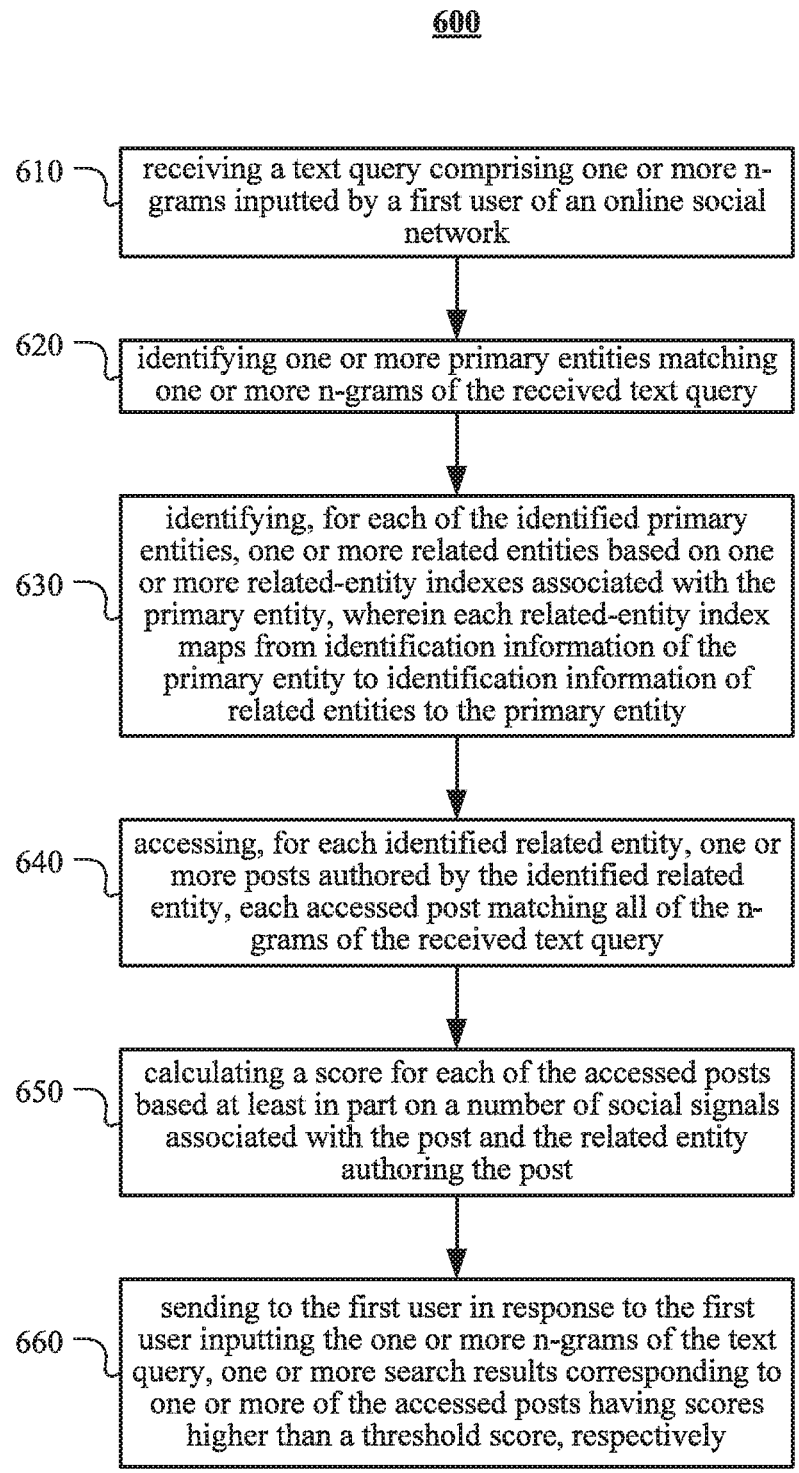
FIG. 6 illustrates an example method for providing search results corresponding to posts authored by related entities to a text query.

FIG. 6 illustrates an example method 600 for providing search results corresponding to posts authored by related entities to a text query. The method may begin at step 610, where the social-networking system 160 may receive a text query comprising one or more n-grams inputted by a first user. At step 620, the social-networking system 160 may identify one or more primary entities matching one or more n-grams of the received text query. At step 630, the social-networking system 160 may identify, for each of the identified primary entities, one or more related entities based on one or more related-entity indexes associated with the primary entity, wherein each related-entity index maps from identification information of the primary entity to identification information of related entities to the primary entity. At step 640, the social-networking system 160 may access, for each identified related entity, one or more posts authored by the identified related entity, each accessed post matching all of the n-grams of the received text query. At step 650, the social-networking system 160 may calculate a score for each of the accessed posts based at least in part on a number of social signals associated with the post and the related entity authoring the post. At step 660, the social-networking system 160 may send, to the first user in response to the first user inputting the one or more n-grams of the text query, one or more search results corresponding to one or more of the accessed posts having scores higher than a threshold score, respectively. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for providing search results corresponding to posts authored by related entities to a text query including the particular steps of the method of FIG. 6, this disclosure contemplates any suitable method for providing search results corresponding to posts authored by related entities to a text query including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects.

In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 7:
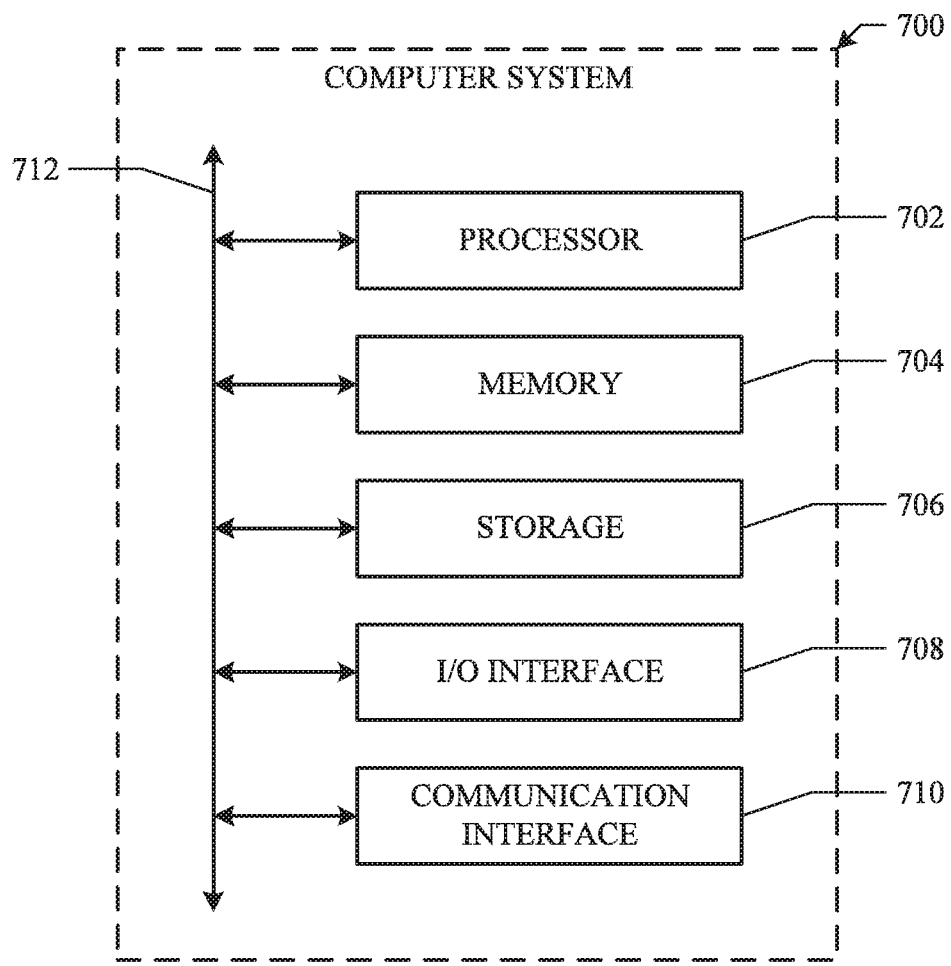
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
receiving, from a client system of a first user of an online social network, a text query comprising one or more n-grams inputted by the first user;
identifying one or more primary entities matching one or more n-grams of the received text query;
identifying, for each of the identified primary entities, one or more related entities based on one or more related-entity indexes associated with the primary entity, wherein each related-entity index maps from identification information of the primary entity to identification information of related entities to the primary entity;
accessing, for each identified related entity, one or more posts authored by the identified related entity, each accessed post matching all of the n-grams of the received text query;
calculating a score for each of the accessed posts based at least in part on a number of social signals associated with the post and the related entity authoring the post; and
sending, to the client system of the first user for display in response to the first user inputting the one or more n-grams of the text query, one or more search results corresponding to one or more of the accessed posts having scores higher than a threshold score, respectively.

2. The method of claim 1, further comprising:
generating one or more of the related-entity indexes based at least in part on one or more online encyclopedic indexes.

3. The method of claim 1, further comprising:
generating one or more of the related-entity indexes based at least in part on social-graph information associated with the one or more primary entities.

4. The method of claim 1, further comprising:
generating one or more of the related-entity indexes based at least in part on a co-occurrence of references to the one or more primary entities with references to the one or more related entities within content associated with the online social network.

5. The method of claim 1, further comprising generating a related-entity index for at least one of the identified primary entities by:
identifying one or more similar entities to the primary entity; and
populating the related-entity index for the primary entity with one or more related entities extracted from one or more related-entity indexes associated with the identified similar entities.

6. The method of claim 1, wherein each related-entity index comprises relevance scores for the related entities with respect to the primary entity associated with the related-entity index.

7. The method of claim 6, further comprising, for each related-entity index associated with a primary entity, calculating the relevance score for each related entity based at least in part on one or more of:
a similarity coefficient between the related entity and the primary entity;
an affinity coefficient between the related entity and the primary entity;
a frequency of co-occurrence of references to the related entity and the primary entity within content associated with the online social network; or
a related-entity index associated with the related entity listing the primary entity.

8. The method of claim 6, wherein calculating the score for at least one of the accessed posts is further based on a relevance score for the related entity authoring the post with respect to the primary entity.

9. The method of claim 1, wherein one or more of the accessed posts are published on one or more profile interfaces corresponding to one or more of the identified related entities, respectively.

10. The method of claim 1, wherein the social signals associated with the post comprise one or more of:
a number of likes associated with the post;
a number of comments on the post;
a number of shares of the post; or
a change in a growth rate of an amount of social activities associated with the post.

11. The method of claim 1, wherein the social signals associated with the related entity authoring the post comprise one or more of:
a number of followers for the related entity;
a number of visits to a profile interface corresponding to the related entity; or
a number of likes on the related entity.

12. The method of claim 1, wherein each search result comprises a snippet associated with the related entity authoring the post corresponding to the search result, wherein the snippet comprises information describing a relationship between the related entity and the primary entity associated with the related entity.

13. The method of claim 1, wherein the search results are organized based at least in part on the scores of the posts associated with the search results.

14. The method of claim 1, further comprising:
accessing, for each identified primary entity, one or more posts authored by the identified primary entity, each accessed post matching all of the n-grams of the received text query;
calculating a score for each of the accessed posts based at least in part on a number of social signals associated with the post and the primary entity authoring the post; and
sending, to the client system of the first user for display in response to the first user inputting the one or more n-grams of the text query, one or more search results corresponding to one or more of the accessed posts having scores higher than a threshold score, respectively.

15. The method of claim 1, further comprising:
storing text associated with each of one or more trending topics included in a list of trending topics, the text comprising one or more of:
a keyword;
a headline describing the topic; or
a link to a content object about the topic; and
identifying one or more trending topics matching one or more n-grams of the received text query.

16. The method of claim 15, further comprising, for each of the identified trending topics, identifying one or more primary entities matching the stored text associated with the identified trending topic.

17. The method of claim 15, wherein calculating the score for each of the accessed posts is further based on a time decay factor associated with the post, wherein the time decay factor for each post is based on a duration of time between a time associated with the post and a time of an event associated with one of the identified trending topics.

18. The method of claim 15, wherein calculating the score for each of the accessed posts is further based on a geographic distance between a location associated with the related entity authoring the post and a location of an event associated with one of the identified trending topics.

19. One or more computer-readable non-transitory storage media embodying software that is operable when executed to:
receive, from a client system of a first user of an online social network, a text query comprising one or more n-grams inputted by the first user;
identify one or more primary entities matching one or more n-grams of the received text query;
identify, for each of the identified primary entities, one or more related entities based on one or more related-entity indexes associated with the primary entity, wherein each related-entity index maps from identification information of the primary entity to identification information of related entities to the primary entity;
access, for each identified related entity, one or more posts authored by the identified related entity, each accessed post matching all of the n-grams of the received text query;
calculate a score for each of the accessed posts based at least in part on a number of social signals associated with the post and the related entity authoring the post; and
send, to the client system of the first user for display in response to the first user inputting the one or more n-grams of the text query, one or more search results corresponding to one or more of the accessed posts having scores higher than a threshold score, respectively.

20. A system comprising:
one or more processors; and
a non-transitory memory coupled to the processors comprising instructions executable by the processors, the processors operable when executing the instructions to:
receive, from a client system of a first user of an online social network, a text query comprising one or more n-grams inputted by the first user;
identify one or more primary entities matching one or more n-grams of the received text query;
identify, for each of the identified primary entities, one or more related entities based on one or more related-entity indexes associated with the primary entity, wherein each related-entity index maps from identification information of the primary entity to identification information of related entities to the primary entity;
access, for each identified related entity, one or more posts authored by the identified related entity, each accessed post matching all of the n-grams of the received text query;
calculate a score for each of the accessed posts based at least in part on a number of social signals associated with the post and the related entity authoring the post; and
send, to the client system of the first user for display in response to the first user inputting the one or more n-grams of the text query, one or more search results corresponding to one or more of the accessed posts having scores higher than a threshold score, respectively.

* * * * *